Figure 1:
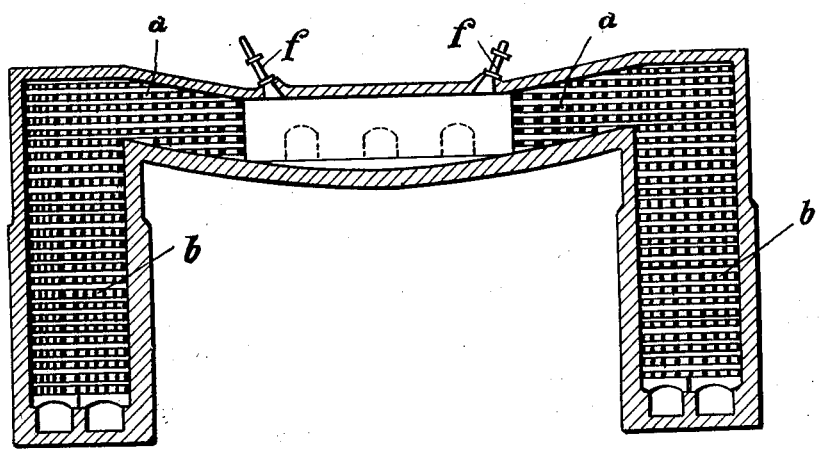

Feb. 22, 1927. 1,618,934
P. KÜHN
SMELTING AND REFINING OF IRON, STEEL, AND OTHER METALS IN
OPEN HEARTH FURNACES
Filed May 3, 1926

Inventor
Paul Kühn
By
James L. Norris
Attorney

Patented Feb. 22, 1927.

1,618,934

UNITED STATES PATENT OFFICE.

PAUL KÜHN, OF NIEDERSCHELDEN-ON-THE-SIEG, GERMANY.

SMELTING AND REFINING OF IRON, STEEL, AND OTHER METALS IN OPEN-HEARTH FURNACES.

Application filed May 3, 1926, Serial No. 106,457, and in Germany February 23, 1925.

This invention relates to improvements in open hearth furnaces for the smelting and refining of iron, steel and other metals.

Very costly apparatus is required in treating steel and other metals in furnaces of the Siemens-Martin type. The construction of the latter furnaces is very complicated and comprises a number of regenerative and slag chambers connected by flues with the hearth. Since the end of the hearth from which the gases are withdrawn is hotter than the end at which the gases enter, the action of the liquid slag in the flues and chambers causes considerable damage to the refractory bricks.

The Martin furnace is used mainly for smelting and making Siemens-Martin steel and only to a slight extent for refining steel, since the high temperature required for refining has a destructive effect upon the furnace and more particularly upon the end of the furnace at which the gases are withdrawn.

In electric furnaces the charge can be melted and, because of the particular construction of and the high temperature obtained in such furnaces, the charge can be refined therein. However, electric furnaces are not economical, mainly on account of the high cost of the current and in consequence such furnaces are adapted only for the production of high grade steels.

According to the present invention the hearth is similar to that of an electric furnace, with the difference, however, that the fuel is introduced into the hearth almost vertically through the arch of the roof.

Chambers are directly connected to each end of the hearth chambers and are so constructed that the liquid slag formed in the checker work flows back to the hearth. The air for combustion is heated by passage through these chambers. The burners are arranged immediately adjacent the outlet of each chamber and alternately supply the fuel. Rich fuel is directly injected into the air current at an angle of 90° and forms with the heated air a very hot and short, narrow flame, which has the same effect as the voltaic arc of the electric furnace. This hot flame bears directly on the charge which is quickly melted. The bath can then be refined in exactly the same manner as in the electric furnace.

The waste gases traverse the hearth and, already cooled to some extent, enter the adjoining chambers, and, after passing through these and the valves, are led to the chimney.

The construction of the furnace with the chambers directly adjoining the hearth is such that the waste gases have a long path to traverse, so that they are almost completely cooled in these chambers. The air for combustion traverses the chambers in the opposite direction and is highly heated thereby so that substantially all of the heat given up by the waste gases is returned to the furnace.

The apparatus is particularly adapted for use with rich gases, such as distillation, lighting and coke oven gases, all tar and mineral oils, tar, pulverized coal, mixtures of poor gases with pulverized fuel, distillation and lighting gas and the like.

The invention has the following advantages over the Siemens-Martin furnaces in use up to the present time:—

1. High grade steels can be produced by the furnace of this invention.
2. Any rich and gaseous fuel may be used.
3. The installation costs are considerably less than for the usual forms of furnace.
4. By the practically complete recovery of the heat of the waste gases the fuel consumption is considerably less than in furnaces commonly used.
5. The whole process is consequently carried out at less cost than those in present use.

In the accompanying drawing which shows a furnace constructed according to the invention, Fig. 1 is a vertical section of a furnace embodying the invention.

Figure 2:
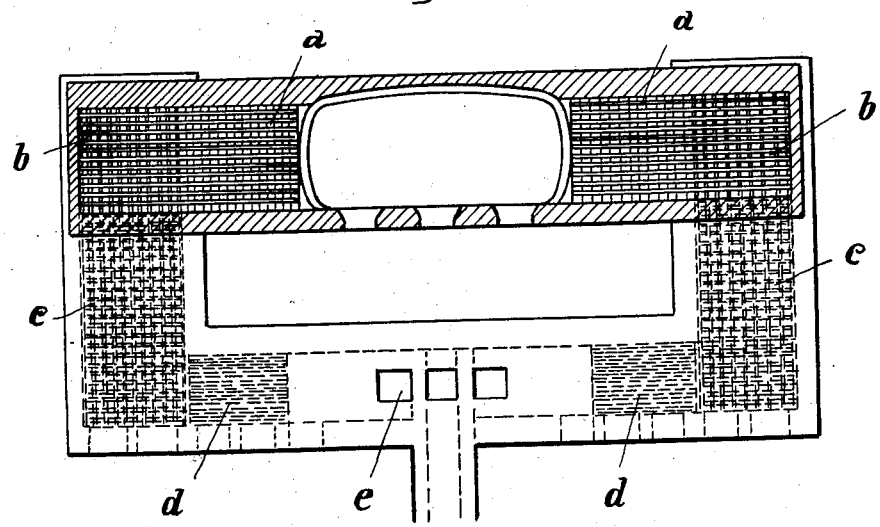

Fig. 2 is a horizontal section of the same.

Chambers $a$ are arranged on each side of the hearth and other chambers $b$, $c$, $d$ are connected to the chambers $a$.

The air for combustion is led alternately to and from the chambers and similarly the heated waste gases are led from the hearth alternately to and from the chambers in the opposite direction to the air. The burners $f$ are disposed over the hearth adjacent the outlets of the chambers $a$. Checker work is contained in each of the chambers $a$, $b$, $c$ and $d$ and occupies the entire space between the floors and the roofs of said chambers. The floors of the chambers $a$ slope forward to the hearth in order to return any slag formed in said chambers.

I claim:

An open hearth regenerative furnace for the smelting and refining of metals, comprising a hearth, chambers on both sides of the hearth containing regenerative checker work, said chambers and checker work being immediately contiguous to the hearth and communicating directly therewith, the checker work occupying the entire space between the floors and roofs of said chambers, the floors of said chambers sloping into said hearth, additional chambers adjoining and directly communicating with said first-named chambers and also containing regenerative checker work, thereby forming a path of maximum length for the passage of the waste gases and resulting in complete cooling of the latter, said chambers being adapted for alternate connection with the air supply and with the waste gases.

In testimony whereof I have hereunto set my hand.

PAUL KÜHN.